3,023,395
REGENERATION OF SODIUM ZEOLITE
Sidney B. Bowman, 3223 12th Ave. W., Seattle, Wash., assignor of one-half to Richard L. Kelleher, Seattle, Wash.
No Drawing. Filed Aug. 3, 1959, Ser. No. 831,000
4 Claims. (Cl. 23—112)

The present invention relates to zeolites (cation exchangers) used on the sodium cycle and regenerated with sodium chloride. More particularly, the invention relates to improvements in the regeneration of the zeolite in cases wherein the water softened contains iron in the ferric form.

There are two main groups of zeolites used on the sodium cycle, and namely (1) organic and (2) inorganic or siliceous. The organic zeolites are of the resinous and carbonaceous types and may be regenerated with acid and used on the hydrogen cycle as well as regenerated with salt and used on the sodium cycle. Probably the most widely used type of resinous zeolites are the sulfonated synthetic resins, their cation exchanging properties being due principally to the sulfonic groups introduced by the sulfonating process. These resinous exchangers are sulfonated polystyrene products in the form of small spherical beads which are amber in color and usually have an average mesh size of 0.7 mm. The carbonaceous type of organic zeolite, on the other hand, is produced by sulfonation of coal with fuming sulfuric acid. This sulfonated organic coal derivative is a black granular material normally having an average mesh size of 0.5 mm.

The inorganic cation exchangers are complex double silicates and may be classified as (1) green sand or glauconite type and (2) synthetic gel type. The first of these types are greenish-black rounded granules about the size of fine sand grains (about 0.4 mm. mesh size) which are obtained by refining and processing the mineral glauconite, while the synthetic gel type is in the form of white angular particles (commonly 0.8 mm. mesh size) consisting in general of hydrated silicates of sodium and aluminum.

As used hereinafter the term "sodium zeolite" shall be construed to mean any of the above discussed zeolites which have the property of replacing polyvalent positive ions or in solution with sodium ions. In the zeolite softening of water the calcium and magnesium present there in as a bicarbonate, sulfate and/or chloride are taken up by the zeolite which gives sodium in exchange. If iron is present in the water in the ferrous form it also will be removed by base exchange, but if oxygen is also present in the water the iron is converted to the ferric form and will be removed only by depositing on the zeolite. This will ultimately so foul the pores of the zeolite as to materially impair its capacity. Such ferric iron is not removed by the normal regenerating process of passing brine through the zeolite bed.

Accordingly, the present invention aims to provide an improved regenerating process for sodium zeolites which will free the zeolite of ferric iron deposits.

I have discovered that the addition of sodium gluconate to regenerating brine results in insoluble ferric compounds which will not adhere to or clog the pores of sodium zeolites, and thus may be readily washed out of a zeolite bed during the flushing out of the salt. Any of the sodium gluconate not required for this function is free to assist the sodium chloride in the regenerating function. The amount of sodium gluconate added to the regenerating solution is not critical and normally 1% to 5% by weight of the salt in the saturated brine regenerating solution is sufficient when used during each regeneration. The expense of sodium gluconate is presently the only limiting factor on the maximum amount to be used.

Of importance is the fact that a sodium zeolite bed which has been regenerated several times without the use of sodium gluconate and has become gradually fouled by ferric compounds can nevertheless be restored by adding sodium gluconate. Samples of sodium zeolite so fouled, by ferric compounds, as to be no longer suitable for commercial softening usage have been substantially cleaned of such compounds by an eight hour submersion in a 1% water solution by weight of sodium gluconate. In such a test the iron appears primarily in an insoluble form which has no tendency to adhere to the zeolite particles. This iron separating function of the sodium gluconate is in no wise affected in companion tests on like samples of zeolite wherein the sodium gluconate is present in a saturated brine solution rather than a water solution.

The addition of sodium gluconate to brine regenerating solutions operates with equal success on all of the above-noted sodium zeolite softeners.

It is thought that the invention will have been clearly understood from the foregoing detailed description of the illustrated now preferred embodiment. Modifications may be resorted to without departing from the spirit of the invention and I accordingly intend that no limitations be implied and that the hereto annexed claims be given a scope fully commensurate with the broadest interpretation to which the employed language fairly admits.

What I claim is:
1. A regenerating solution for sodium zeolite having ferric deposits therein consisting of sodium gluconate dissolved in a saturated solution of sodium chloride.
2. A process of regenerating sodium zeolite having ferric deposits therein comprising treating the zeolite with a treating solution consisting of a sodium gluconate solution.
3. A process of regenerating sodium zeolite having ferric deposits therein comprising immersin gthe zeolite in a solution consisting of sodium gluconate in a solution of sodium chloride.
4. A process of regenerating sodium zeolite having ferric deposits therein comprising immersing the zeolite in a solution consisting of sodium gluconate dissolved in a saturated solution of sodium chloride, and then cleaning the zeolite with a water rinse.

References Cited in the file of this patent

UNITED STATES PATENTS

| | | |
|---|---|---|
| 2,004,257 | Tschirner | June 11, 1935 |
| 2,351,160 | Stone et al. | June 13, 1944 |
| 2,584,017 | Dvorkovitz et al. | Jan. 29, 1952 |